United States Patent [19]

Sefton et al.

[11] 4,193,970

[45] Mar. 18, 1980

[54] PROCESS FOR THE PRECIPITATION OF IRON AS JAROSITE

[75] Inventors: Verner B. Sefton, Edmonton; Godefridus M. Swinkels; Charles R. Kirby, both of Rossland; Roman M. Genik-Sas-Berezowsky, Edmonton, all of Canada

[73] Assignees: Cominco Ltd., Vancouver; Sherritt Gordon Mines Limited, Toronto, both of Canada

[21] Appl. No.: 933,215

[22] Filed: Aug. 14, 1978

[30] Foreign Application Priority Data

Aug. 19, 1977 [CA] Canada ............................... 285090

[51] Int. Cl.² ............................................. C01G 49/14
[52] U.S. Cl. ................................... 423/141; 423/145; 423/146
[58] Field of Search ....................... 423/141, 145, 146

[56] References Cited

U.S. PATENT DOCUMENTS

| 2,871,116 | 1/1959 | Clark | 423/145 |
| 3,493,365 | 2/1970 | Pickering et al. | 423/146 |
| 3,888,748 | 6/1975 | Brennecke | 423/145 |

OTHER PUBLICATIONS

C. I. M. Bulletin, Feb. 1978, pp. 116, 125, 126.
Mellor, Inorganic and Theoretical Chemistry, vol. XIV, Longmans, Green & Co., N. Y., (1935), pp. 248, 249.
Rastas et al., "Treatment of Iron Residues in the Electrolytic Zinc Process," TMS Paper No. A73-11, (Feb., 1973), AIME, N. Y., pp. 2, 3, 18, 19.

Primary Examiner—Herbert T. Carter
Attorney, Agent, or Firm—Arne I. Fors; Robert F. Delbridge

[57] ABSTRACT

A process for precipitation of iron as a jarosite compound from sulfate solution in which said solution fed sequentially through a plurality of reaction zones for oxidation and hydrolysis of ferrous sulfate in the presence of alkali-metal or ammonium ions for jarosite precipitation and simultaneous generation of sulfuric acid is subjected to a "reverse temperature profile", i.e., higher temperature in the last reaction zone than in the first reaction zone, by injection of steam to the last reaction zone.

3 Claims, No Drawings

PROCESS FOR THE PRECIPITATION OF IRON AS JAROSITE

This invention relates to an improved process for the precipitation of iron as jarosite from iron sulfate-containing solutions.

The precipitation of iron from sulfate solution as a jarosite is achieved by oxidation and hydrolysis of ferrous sulfate in the presence of alkali-metal or ammonium ions, while free acid is simultaneously generated. The prior art contains a number of references to processes wherein jarosites are precipitated at relatively low temperatures such as those between 50° and 105° C., and under atmospheric or autogenous pressure. These processes are mostly related to the treatment of zinc plant residues containing zinc ferrites whereby such residues are treated with sulfuric acid solution to dissolve ferrites, the iron is precipitated in the acid, zinc- and iron-containing solution as jarosite and the free acid is neutralized by addition of a basic compound, which is necessary to maintain the reaction. Such processes are disclosed, for example, in U.S. Pat. Nos. 3,434,947, 3,691,038, 3,959,437 and 3,985,857. The purpose of these processes is to recover the zinc and other metal values contained in zinc plant residues and to eliminate iron and excess sulfate or acid from the process.

Other references relate to hydrometallurgical processes wherein iron sulfate-containing solutions are treated at elevated temperatures and pressures for the removal, recovery, or safe disposal of iron, with or without the regeneration of sulfuric acid. For example, in U.S. Pat. No. 2,296,423 there is disclosed a process for treating sulfate solutions containing iron and aluminum by oxidizing ferrous sulfate to ferric sulfate with oxygen in presence of a predetermined amount of an alkali-metal salt in an autoclave at a temperature above 150° C. Free acid is at least partially consumed by the addition of soluble iron oxides. In U.S. Pat. No. 3,436,177, there is disclosed a method for the treatment of acid sulfate leach solutions containing appreciable amounts of dissolved aluminum, iron and other multivalent metal iron impurities by adjusting the concentration of salts of alkali-metals or ammonium and passing the solution with short retention time through an elongated reaction zone at 150° to 260° C. under autogenous pressure maintained at 1140 to 1830 kPa while concurrently contacting the solution with an oxidant such as oxygen. In U.S. Pat. No. 3,798,304 there is disclosed a process for the hydrometallurgical treatment of materials containing nickel, cobalt, copper and acid-soluble iron minerals which comprises acid leaching the materials at temperatures between 70° and 200° C. in the presence of a sufficient quantity of an iron precipitating agent selected from agents capable of introducing the ions of ammonium, sodium, potassium, lithium, and combinations thereof to cause substantial precipitation of dissolved iron. In U.S. Pat. No. 3,964,901 there is disclosed a hydrometallurgical process for treating metal sulfides containing iron and non-ferrous metals including copper which comprises thermally activating the metal sulfides, subjecting activated sulfides to an acid leach for production of ferrous sulfate solution, which is separated from the solid sulfide residue containing non-ferrous metal values, and which solution is oxidized and hydrolyzed at temperatures above 140° C. under an oxygen partial pressure between 350 and 1400 kPa in the presence of ammonia, or ammonium or alkali-metal compounds for the precipitation of jarosite and generation of sulfuric acid.

Although the prior art discloses the general operating conditions for the precipitation of iron from sulfate solutions as jarosite, the prior art is generally silent on the practical execution of jarosite precipitation. In a commercially operated process, the use of an elongated reaction zone such as disclosed in U.S. Pat. No. 3,436,177 is impractical as the short retention times result in an undesirably high iron content in the final solution, while longer retention times require a disproportionately long reaction zone which becomes subject to severe scaling and erosion. Performing the jarosite precipitation in one or more autoclaves or a compartmented autoclave, as suggested in the art, also results in an undesirably high iron content in the final solution, while, in addition, poor liquid-solids separation characteristics and poor temperature control of the precipitation are experienced.

We have now invented a practical method for performing the jarosite precipitation whereby the above recited problems are alleviated. Thus, there is provided in a process for the precipitation of iron from ferrous sulfate-containing solutions by reacting the solutions with an oxygen-bearing gas in the presence of ammonia or ammonium or alkali-metal compounds at a temperature above the boiling point of the solution and under super-atmospheric pressure of an oxygen-bearing gas for precipitation of jarosite and generation of sulfuric acid, the improvement which comprises the steps of feeding ferrous sulfate-containing solution to the first of a plurality of reaction zones, feeding a compound chosen from the group consisting of ammonia, ammonium compounds and alkali-metal compounds to said ferrous sulfate-containing solution in said first reaction zone, feeding an oxygen-bearing gas chosen from the group consisting of oxygen, air and oxygen-enriched air into said first reaction zone to establish an oxygen partial pressure in the range of about 50 to 1400 kPa, said solution, said compound and said oxygen-bearing gas forming a reaction mixture, causing said mixture to flow through the reaction zones to the last of said plurality of reaction zones, injecting steam in said last reaction zone in an amount sufficient to establish a temperature in said last reaction zone that is above the temperature in said first reaction zone, and discharging the reaction mixture from said last reaction zone.

The invention will now be described in detail. In the process of the invention, ferrous sulfate-containing solution is reacted with oxygen and a jarosite-forming compound to form a jarosite of the general formula (A)-Fe$_3$(SO$_4$)$_2$(OH)$_6$ wherein A represents OH$_3$(hydronium), NH$_4^+$, Na$^+$, K$^+$, Li$^+$, Rb$^+$, or Cs$^+$. The reactions may be represented by the following equations wherein A is chosen as NH$_4^+$ added as NH$_4$OH:

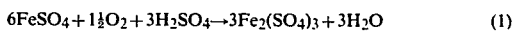
$$6FeSO_4 + 1\tfrac{1}{2}O_2 + 3H_2SO_4 \rightarrow 3Fe_2(SO_4)_3 + 3H_2O \tag{1}$$

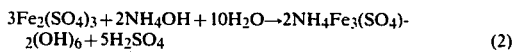
$$3Fe_2(SO_4)_3 + 2NH_4OH + 10H_2O \rightarrow 2NH_4Fe_3(SO_4)_2(OH)_6 + 5H_2SO_4 \tag{2}$$

Hydronium jarosite, which may be represented by the formula H$_3$OFe$_3$(SO$_4$)$_2$(OH)$_6$, is formed under similar conditions as the above mentioned jarosites and may contaminate these jarosites. As can be seen from the reaction equations, jarosite formation results in a net acid formation of $\tfrac{5}{6}$ mole H$_2$SO$_4$ per mole of iron precipitated. At atmospheric pressure conditions, this acid must be neutralized to attain the desired degree of iron removal. To obtain the high acid, low iron-containing solution suitable for re-use, it is necessary to operate at superatmospheric pressures and high temperatures (above 100° C.). The degree of iron removal is a function of acid concentration, temperature and retention time, i.e., iron removal is inversely proportional to acid concentration and directly proportional to temperature.

As the degree of iron removal is also a function of retention time, it is necessary to conduct the jarosite precipitation in more than one reaction zone. Thus, the reaction zones may comprise two or more reaction vessels, such as autoclaves in series or may comprise an autoclave which has a plurality of compartments. The separate autoclaves or the compartments in a multi-compartments autoclave are connected in series to allow mass transfer. The contents of each autoclave or compartment of an autoclave are agitated. For practical and economic reasons, the use of a multi-compartment autoclave is preferred and the following description will be directed to the use of a multi-compartment autoclave having at least two compartments, preferably three or four compartments.

The feed to the process of the invention consists of an acidic ferrous sulfate solution which contains a relatively high concentration of ferrous sulfate and a relatively low concentration of sulfuric acid. Such solutions are usually obtained from pickling operations or metallurgical operations and may or may not contain other dissolved compounds. For example, the feed solution may contain from 20 to 100 g/l iron as ferrous sulfate and up to 50 g/l, preferably 1 to 30 g/l, free sulfuric acid. At lower free acid concentrations, the removal of iron is more complete. If desired, a neutralizing agent may be added to reduce the acid content to the desired concentration.

Because of the inverse solubility of ferrous sulfate in acidic sulfate solutions (for example, the solubility of ferrous sulfate decreases from about 93 g/l at 80° C., to about 35 g/l at 154° C., to about 21 g/l at 185° C.), ferrous sulfate tends to crystallize from feed solutions, especially from those with high iron content, when the solution is treated at elevated temperatures above the boiling point of the solution. Precipitated ferrous sulfate not only interferes with the precipitation of iron as jarosite and causes erosion of equipment, but also contaminates the jarosite which affects the separation of jarosite from the reaction slurry and also results in an undesirable high iron content in the final solution.

Acidic ferrous sulfate solution is fed into the first compartment of the autoclave. The solution may be fed at room temperature but is preferably preheated by conventional means to a temperature below the temperature at which ferrous sulfate may precipitate from the solution, usually in the range of 70° to 130° C., preferably about 110° C. The solution is reacted with an oxygen-bearing gas under pressure to oxidize ferrous iron to ferric iron and a suitable compound to form jarosite with iron sulfate at a temperature in the range of 100° to 230° C. Oxygen-bearing gas is added to the vapor phase in the first compartment to create an oxygen partial pressure in the range of 50 to 1400 kPa, preferably 350–700 kPa. The oxygen-bearing gas may be a gas chosen from the group consisting of oxygen, air and oxygen-enriched air. A suitable compound to form jarosite may be one of a number of compounds chosen from the group consisting of gaseous ammonia and ammonium and alkali-metal compounds. Suitable ammonium compounds may be ammonium hydroxide, or ammonium sulfate, sulfite or bisulfite and analogous alkali-metal compounds of sodium or potassium may also be used. In the case of using gaseous ammonia, the ammonia is preferably sparged into the solution in the first compartment (adding ammonia to the feed solution may result in precipitation of undesirable iron compounds). In the case of using other jarosite-forming compounds, the compounds are mixed below the liquid surface in the first compartment, preferably in the form of an aqueous solution. The jarosite-forming compound is added in an amount which is from 50 to 200%, preferably from about 70 to 100%, of the amount that is stoichiometrically required to form jarosite with the ferrous sulfate solution in combination with oxygen, i.e., ferric sulfate solution.

To attain the required operating temperature, steam is injected into the vapor phase in the last compartment of the autoclave. The amount of steam should be sufficient to establish a temperature in the last compartment in the range of 170° to 230° C., preferably 175° to 200° C. A temperature of 170° to 230° C. is necessary to achieve a high degree of iron removal from solution and to allow higher initial iron and acid concentrations. The injection of steam into the last compartment of the autoclave is essential to establish a reverse temperature gradient in the autoclave whereby the temperature in the first compartment is lower than that in the last one. The temperature in the first compartment is at least 100° C. but is usually in the range of about 100° to 160° C. The reverse temperature gradient in the autoclave results in a number of important advantages. Firstly, the solubility of ferrous sulfate is higher at the lower temperature in the first compartment which results in a more complete oxidation of ferrous to ferric and reduces the chance of crystallization of ferrous sulfate. Secondly, the oxygen partial pressure is higher in the first compartment as it is not being suppressed by the partial pressure of water as would be the case if steam were injected into the first compartment; consequently, ferrous sulfate is easier and more completely oxidized to ferric sulfate. Thirdly, the higher temperature in the last compartment, and also the higher temperatures in any in-between compartments, results in a more complete precipitation of jarosite and a consequent lower iron content of the final solution. Fourthly, process control, particularly, the control of temperatures in the process, steam injection, and the addition of oxygen-bearing gas and jarosite-forming compound, is easy and not subject to great fluctuations. Fifthly, accumulation and agglomeration of ferrous sulfate crystals in the first compartment which result in severe erosion and corrosion are substantially eliminated. Retention times of the reaction mixture in the reaction vessel in the range of 20 to 90 minutes, preferably 30 to 60 minutes, are sufficient to obtain the desired degree of iron removal.

To avoid corrosion, a few g/l copper, for example, 0.1 to 3 g/l copper as copper sulfate should be present in the ferrous sulfate-containing solution. This copper sulfate may be present in the feed solution or may be added to the solution.

After completion of the precipitation, the reaction slurry is discharged from the last compartment of the autoclave and subjected to further treatment. The discharging may be accomplished continuously or intermittently and further treatment may comprise flashing to release pressure and liquid-solids separation to obtain a final solution and a jarosite precipitate. The final solution, which may contain from 2 to 15 g/l, usually from 3 to 7 g/l iron, and from 40 to 60 g/l sulfuric acid, may be re-used while the jarosite may be impounded.

The invention will now be illustrated by means of the following non-limitative examples:

EXAMPLE 1

This Example illustrates the precipitation of jarosite from an acidic ferrous sulfate solution by feeding solution, ammonia and oxygen to the first compartment of a four compartment autoclave. To maintain the reaction at the desired temperature, steam was also injected in the first compartment. Operating data and test results are given in Table 1.

TABLE 1

| Test No. | | 1 | 2 | 3 |
|---|---|---|---|---|
| Solution Feed Rate | (l/min) | 22.3 | 22.3 | 22.3 |
| Solution Feed Temperature | (°C.) | 70 | 71 | 71 |
| NH$_3$ Feed Rate | (% stoich.) | 74 | 80 | 78 |
| Nominal Retention Time | (min.) | 34 | 34 | 34 |
| O$_2$ Overpressure | (kPa) | 717 | 717 | 717 |
| Autoclave Temperatures | (°C.) | | | |
| compartment 1 | | 175 | 175 | 176 |
| compartment 2 | | 191 | 191 | 191 |
| compartment 3 | | 191 | 190 | 191 |
| compartment 4 | | 189 | 188 | 189 |
| average | | 186 | 185 | 187 |
| Feed Solution | Fe$_hd T$* | 67.7 | 69.8 | 70.1 |
| Analysis (g/l) | Fe$^{2+}$ | 67.9 | 70.0 | 70.0 |
| | H$_2$SO$_4$ | 26.8 | 27.7 | 27.0 |
| End Solution | Fe$_T$ | 11.5 | 9.1 | 7.5 |
| Analysis (g/l) | Fe$^{2+}$ | 0.7 | 0.8 | 0.9 |
| | H$_2$SO$_4$ | 31.7 | 36.9 | 32.6 |
| | NH$_3$ | 1.0 | 1.2 | 1.2 |
| Residue Analysis (%) | Fe | 34.1 | 33.9 | 33.7 |
| | S$_T$** | 13.5 | 13.3 | 13.0 |
| | NH$_3$ | 2.6 | 2.7 | 2.7 |

*Fe$_T$ = total iron
**S$_T$ = total sulfur

The test results show that iron removal was incomplete i.e., end solutions contained from 7 to 12 g/l iron. The temperature of about 175° C. in the first compartment of the autoclave rose to about 190° C. in the last compartment of the autoclave.

EXAMPLE 2

This Example illustrates the precipitation of jarosite according to the process of the invention whereby acidic ferrous sulfate solution, ammonia and oxygen are fed into the first compartment of a four compartment autoclave and steam injected into the vapor phase in the fourth compartment. Operating data and test results are given in Table 2.

TABLE 2

| Test No. | | 1 | 2 | 3 | 4 |
|---|---|---|---|---|---|
| Solution Feed Rate | (l/min) | 24.2 | 22.1 | 24.1 | 21.8 |
| Solution Feed Temperature | (°C.) | 60 | 60 | 65 | 65 |
| NH$_3$ Feed Rate | (% Stoich.) | 82 | 82 | 160 | 150 |
| Nominal Retention Time | (min.) | 35 | 35 | 35 | 37 |
| Autoclave Total Pressure | (kPa) | 2006 | 2000 | 1965 | 2150 |
| Autoclave Temperatures | (°C.) | | | | |
| compartment 1 | | 120 | 115 | 114 | 121 |
| compartment 2 | | 141 | 145 | 146 | 166 |
| compartment 3 | | 152 | 160 | 162 | 182 |
| compartment 4 | | 155 | 170 | 181 | 198 |
| average | | 142 | 148 | 151 | 167 |

TABLE 2-continued

| Test No. | | 1 | 2 | 3 | 4 |
|---|---|---|---|---|---|
| Feed Solution | Fe$_T$ | 49.1 | 53.6 | 45.5 | 48.9 |
| Analysis (g/l) | Fe$^{2+}$ | 48.9 | — | 45.0 | 48.7 |
| | H$_2$SO$_4$ | 27.0 | 28.5 | 29.5 | 23.0 |
| End Solution | Fe$_T$ | 3.9 | 3.0 | 6.5 | 3.3 |
| Analysis (g/l) | Fe$^{2+}$ | 0.7 | 0.5 | 0.4 | 0.3 |
| | H$_2$SO$_4$ | 32.2 | 30.9 | 47.0 | 40.0 |
| | NH$_3$ | 3.2 | 2.6 | 4.3 | 3.2 |
| Residue Analysis (%) | Fe | 33.4 | 33.6 | 33.0 | 32.8 |
| | S$_T$ | 13.8 | 15.0 | 13.6 | 13.2 |
| | NH$_3$ | 2.8 | 2.7 | 2.6 | 2.9 |

The test results show that iron removal was much improved, i.e., the residual iron content was less than 7 g/l and in most cases less than 4 g/l. The improved iron removal was obtained in spite of average autoclave temperatures which were 20° to 40° C. below those recited in Example 1.

What we claim as new and desire to protect by Letters Patent of the United States is:

1. In a process for the precipitation of iron from ferrous sulfate-containing solutions by reacting the solutions with an oxygen-bearing gas in the presence of ammonia or ammonium or alkali-metal compounds at a temprature above the boiling point of the solution in the range of 100° to 230° C. and under super-atmospheric pressure of an oxygen-bearing gas for precipitation of jarosite and production of sulfuric acid, the improvement which comprises the steps of preheating ferrous sulfate-containing solution to a temperature in the range of 70° to 130° C., said temperature being below the temperature at which ferrous sulfate may precipitate from said solution; feeding preheated ferrous sulfate-containing solution comprising iron in an amount in the range of 20 to 100 g/L iron as ferrous sulfate and an amount of sulfuric acid of up to 50 g/L to the first of a plurality of reaction zones; maintaining a temperature in said first reaction zone of at least 100° C.; feeding a compound chosen from the group consisting of ammonia, ammonium compounds and alkali-metal compounds to said ferrous sulfate-containing solution in said first reaction zone; feeding an oxygen-bearing gas chosen from the group consisting of oxygen, air and oxygen-enriched air into said first reaction zone to establish an oxygen partial pressure in the range of 50 to 1400 kPa; said solution, said compound and said oxygen-bearing gas forming a reaction mixture; causing said mixture to flow through the reaction zones to the last of said plurality of reaction zones; retaining said reaction mixture in said reaction zones for a time in the range of 20 to 90 minutes; injecting steam in said last reaction zone in an amount sufficient to establish a temperature in said last reaction zone in the range of 170° to 230° C., said temperature being above the temperature in said first reaction zone; and discharging the reaction mixture, wherein the reaction mixture discharged from said last reaction zone contains iron in an amount in the range of 2 to 15 g/L iron and sulfuric acid in the range of 40 to 60 g/L, from said last reaction zone.

2. A process as claimed in claim 1, wherein said plurality of reaction zones comprises at least three reaction zones; said ferrous sulfate-containing solution is preheated to a temperature of 110° C.; the temperature in said first reaction zone is in the range of 100° to 160° C. and the temperature in said last reaction zone is in the range of 175° C. to 200° C.; the oxygen partial pressure is in the range of 350 to 700 kPa; said compound is ammonia and ammonia is sparged into said ferrous sulfate-containing solution in said first reaction zone in an amount in the range of 50 to 200% of the amount that is stoichiometrically required to form jarosite; and the reaction mixture is retained in said reaction zones for a time in the range of 30 to 60 minutes.

3. A process as claimed in claim 1 or 2, wherein said ferrous sulfate-containing solution contains an amount of copper in the range of 0.1 to 3 g/l copper as copper sulfate.

* * * * *